United States Patent
Teitel et al.

[11] Patent Number: 5,812,257
[45] Date of Patent: Sep. 22, 1998

[54] ABSOLUTE POSITION TRACKER

[75] Inventors: Michael A. Teitel; Jean-Jacques G. Grimaud, both of Portola Valley, Calif.

[73] Assignee: Sun Microsystems, Inc., Palo Alto, Calif.

[21] Appl. No.: 165,046

[22] Filed: Oct. 6, 1993

Related U.S. Application Data

[63] Continuation of Ser. No. 938,560, Aug. 28, 1992, abandoned, which is a continuation of Ser. No. 821,276, Jan. 10, 1992, abandoned, which is a continuation of Ser. No. 620,425, Nov. 29, 1990, abandoned.

[51] Int. Cl.⁶ .............. G01B 11/26; G01S 3/02; G09G 5/00; H04N 9/47
[52] U.S. Cl. .................. 356/141.4; 342/463; 345/8; 348/53
[58] Field of Search ............... 342/450, 463–5, 342/417, 449, 387, 457, 451; 356/139.03, 3.1, 3.11, 3.12, 141.4, 147, 141.5, 152.1; 348/53; 345/8; 364/516

[56] References Cited

U.S. PATENT DOCUMENTS

| | | | |
|---|---|---|---|
| Re. 31,375 | 9/1983 | Sellers et al. | 342/146 |
| 3,509,566 | 4/1970 | Vorie | 342/146 |
| 3,691,560 | 9/1972 | Hammack | 342/387 |
| 3,898,445 | 8/1975 | MacLeod et al. | 356/152.1 |
| 4,396,945 | 8/1983 | DiMatteo et al. | 364/559 |
| 4,649,504 | 3/1987 | Krouglicof et al. | 364/559 |
| 4,884,219 | 11/1989 | Waldren | 364/514 |
| 4,930,888 | 6/1990 | Freisleben et al. | 356/141.3 |
| 5,100,229 | 3/1992 | Lundberg et al. | 356/139.03 |

OTHER PUBLICATIONS

Burgett et al, "The Development and Applications of GPS Determined Attitude," Paper For National Telesystems Conf. (NTC), Nov. 1983.

Rath et al, "Attitude Estimation Using GPS", ION, National Technical Meeting, San Mateo, Jan. 1989.

Kennedy et al, "Direction Finding Antenna Systems" *Antenna Engineering Handbook*, 2nd Ed. 1984.

*Primary Examiner*—Gregory C. Issing
*Attorney, Agent, or Firm*—Conley, Rose & Tayon

[57] ABSTRACT

A position tracker wherein a base unit scans a selected path with electromagnetic signals. A remote unit whose position relative to the base unit is to be detected includes a sensor for detecting the signals from the base unit. When the scanning signals are detected by the remote unit, the remote unit transmits a response signal to the base unit. The base unit may calculate the angular position of the remote unit relative to the base unit by comparing the time intervals between successive response signals. By locating multiple base units in different positions, the position of the remote unit along multiple coordinate axes may be determined. By adding multiple sensors and response transmitters to the remote unit, the roll, pitch and yaw of the remote unit also may be calculated.

4 Claims, 3 Drawing Sheets

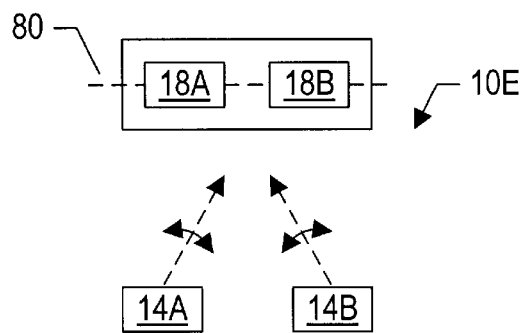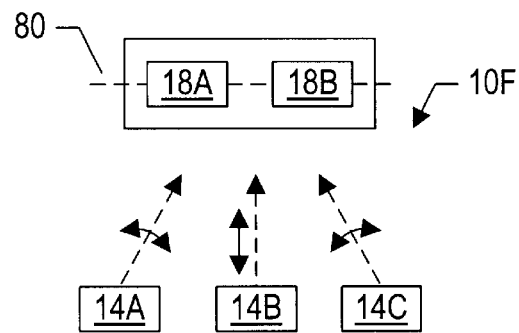
FIG. 7          FIG. 8
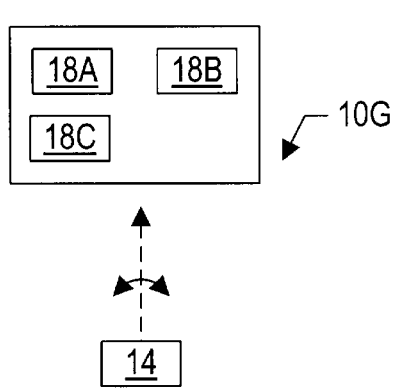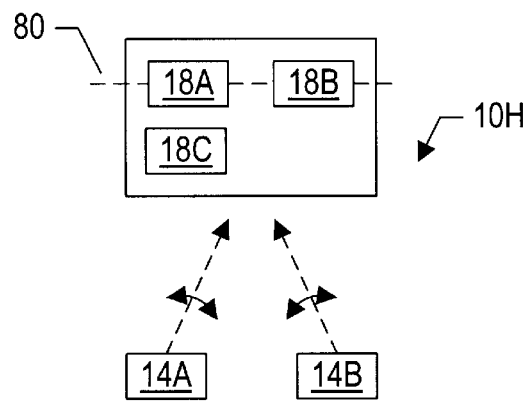
FIG. 9          FIG. 10
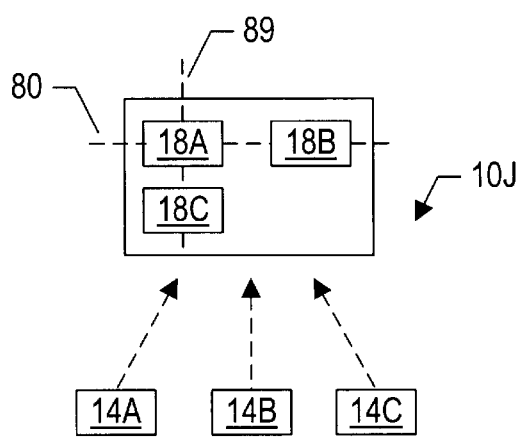
FIG. 11

ABSOLUTE POSITION TRACKER

This is a continuation of application Ser. No. 07/938,560, filed on Aug. 28, 1992, which is a continuation of application Ser. No. 07/821,276, filed Jan. 10, 1992, which is a continuation of application Ser. No. 07/620,425, filed Nov. 29, 1990 all now abandoned.

BACKGROUND OF THE INVENTION

This invention relates to position tracking systems and, more particularly, to a position tracker which employs electromagnetic scanning to determine the angular position of an object relative to the scanning element.

Systems are known which determine the position and/or orientation of objects in space. One known system detects body capacitance within a defined field to determine the position of the body within the field. Another system is disclosed in U.S. patent application Ser. No. 07/317,107, entitled Computer Data Entry and Manipulation Apparatus and Method, filed on Feb. 28, 1989. In that system, a computer user wears an instrumented glove assembly which emits ultrasonic signals. Three ultrasonic receivers are disposed about the computer display for receiving the ultrasonic signals. The position of the hand relative to the computer screen may be computed using triangulation methods.

SUMMARY OF THE INVENTION

The present invention is directed to a position tracker wherein a base unit scans a selected path with electromagnetic signals. A remote unit whose position relative to the base unit is to be detected includes a sensor for detecting the signals from the base unit. When the scanning signals are detected by the remote unit, the remote unit transmits a response signal to the base unit. The base unit may calculate the angular position of the remote unit relative to the base unit by comparing the time intervals between successive response signals. By locating multiple base units in different positions, the position of the remote unit along multiple coordinate- axes may be determined. By adding multiple sensors and response transmitters to the remote unit, the roll, pitch and yaw of the remote unit also may be calculated.

BRIEF DESCRIPTION OF THE DRAWINGS

FIG. 7 is a block diagram of an alternative embodiment of a scanning absolute position tracker according to the present invention which uses two base units and two remote units;

FIG. 8 is a block diagram of another embodiment of a scanning absolute position tracker according to the present invention which uses three base units and two remote units;

FIG. 9 is a block diagram of another embodiment of a scanning absolute position tracker according to the present invention which uses a single base unit and three remote units;

FIG. 10 is a block diagram of another embodiment of a scanning absolute position tracker according to the present invention which uses two base units and three remote units; and FIG. 11 is a block diagram of another embodiment of a scanning absolute position tracker according to the present invention which uses three base units and three remote units.

DESCRIPTION OF SPECIFIC EMBODIMENTS

Figure 1:
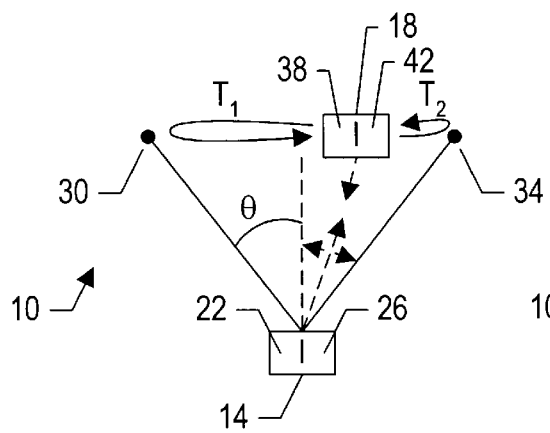
FIG. 1 is a block diagram showing a particular embodiment of a scanning absolute position tracker according to the present invention.

FIG. 1 is a block diagram of a particular embodiment of a scanning absolute position tracking system 10 according to the present invention. In this embodiment, a base signal unit 14 determines the angular position of a remote signal unit 18. Base signal unit 14 includes a signal sensor 22 and a signal source 26. Signal source 26 emits electromagnetic signals which repetitively scan a path back and forth between a first end point 30 and a second end point 34. The scanning signal may be a sheet of light or some other electromagnetic signal. Scanning may be accomplished using a vibrating mirror, galvanometer, polygon, holographic optical element, or some other electro-optic or acousto-optic scanner. Optical leverage (i.e., the use of a lens after the scanning element) may be employed to fine-tune the scanning angle. Remote unit 18 includes a signal sensor 38 and a signal source 42. Signal sensor 38 senses the electromagnetic signals emitted by base signal unit 14, and signal source 42 emits a response signal in response thereto. The response signal may be a radio frequency tone or some other electromagnetic signal. Sensor 22 in base signal unit 14 is used for receiving the response signal emitted by remote signal unit 18. A clock (e.g., 10 mhz) may be used to record the time the response signals are received. Base signal unit 14 calculates the time between response signals, and this produces a repeating series of two time intervals. The first time interval, T1, represents the time during which the signal emitted by base signal unit 14 travels the round trip distance between first end point 30 and remote signal unit 18. The second time interval, T2, represents the time during which the signal emitted by base signal unit 14 travels the round trip distance between remote signal unit 18 and second end point 34. The ratio of the first and second time intervals may be used to determine the angular position of remote signal unit 18 relative to base signal unit 14. In general, the angular position θ=A(T1/T2) where A=the total angular distance scanned by base signal unit 14. Of course, the time values calculated by base signal unit 14 should be adjusted to account for the harmonic nature of oscillating systems.

Figure 2:
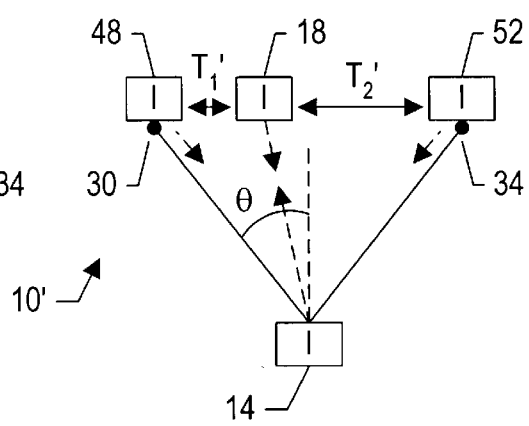
FIG. 2 is a block diagram showing an alternative embodiment of a scanning absolute position tracker according to the present invention.

FIG. 2 is a block diagram of an alternative embodiment of position tracking system 10, labeled 10'. In this embodiment, a remote unit 48 is disposed at first end point 30, and another remote unit 52 is disposed at second end point 34. Like remote unit 18, each remote unit 48 and 52 includes a signal source and a signal sensor and functions in the same manner. Thus, as base unit 14 scans the path between first end point 30 and second end point 34, it will receive response signals from remote units 48 and 52 as well as remote unit 18. These response signals may be used by base unit 14 to calculate time intervals T1' and T2'. Time interval T1' represents the time it takes base signal unit 14 to scan the one-way distance between the first end point and the remote signal unit, and time interval T2' represents the time it takes base signal unit 14 to scan the one-way distance between remote signal unit 18 and second end point 34. In this case, the angular position θ=A(T1/(B2−B1)) where B1 and B2 are the times that the remote signal units 48 and 52 provide their response signals. Of course, T2 could be substituted for T1 to calculate the complementary angle. It should also be noted that the system still works if remote unit 18 is located outside the path defined by first endpoint 30 and second endpoint 34. In this case the fraction is greater than one and the angle is scaled accordingly.

Figure 3:
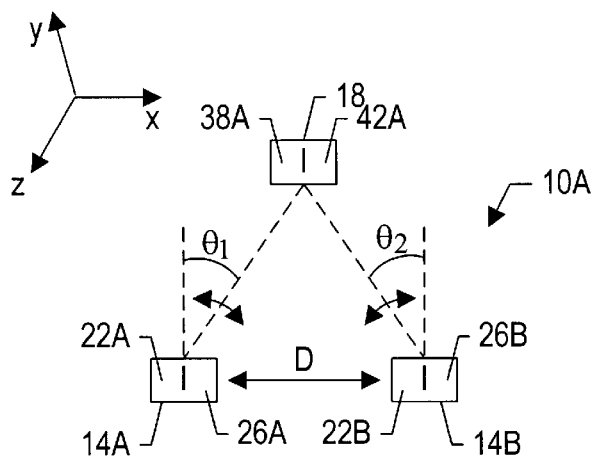
FIG. 3 is a block diagram of another embodiment of a scanning absolute position tracker according to the present invention using two base units and a single remote unit.

FIG. 3 is a block diagram of a scanning absolute position tracking system 10A according to the present invention. In this and the other embodiments to be described, either configuration shown in FIGS. 1 and 2 may be employed. Position tracking system 10A includes two base units labeled 14A and 14B, spaced apart by a distance D, and a single remote unit 18. Base units 14A and 14B include signal sensors 22A and 22B and signal sources 26A and 26B, respectively. Similarly, remote unit 19 includes signal sensor 38A and signal source 42A. In this embodiment, sensor 38A includes a means (not shown) for identifying the base unit associated with the received electromagnetic signal, and signal source 42A transmits a unique signal depending on which base unit signal was received. Separate sensors and sources may be employed or identification could be accomplished through time and/or frequency multipexing. In the latter cases, only one base or remote unit sends its signals at a time, or else the signals comprise different frequencies (e.g. color, sound).

To simplify the discussion of this embodiment and subsequent embodiments, the coordinate system shown in the upper left-hand portion of FIG. 3 shall be employed. In this coordinate system, X values increase toward the right, and Z values increase downwardly. Y values increase perpendicularly and upwardly from the page. Thus, it may be seen that two angular positions, designated THETA 1 and THETA 2 in the XZ plane, may be obtained. Since the base signal units are at a known distance D apart from each other, it is possible to determine not only the angular position of remote signal unit 18 relative to base units 14A and 14B, but the absolute position of remote signal unit 18 in the XZ plane.

Figure 4:
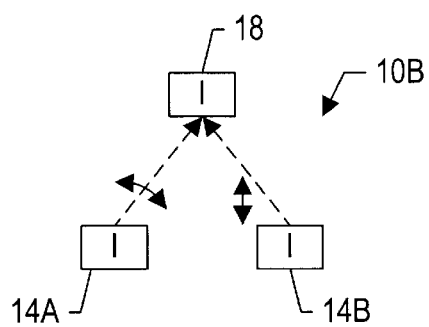
FIG. 4 is a block diagram of an alternative embodiment of the scanning absolute position tracker shown in FIG. 3.

FIG. 4 is a block diagram showing an alternative embodiment of the position tracker shown in FIG. 3. This embodiment also includes base units 14A and 14B and remote signal unit 18. However, in this embodiment base signal unit 14A scans in the XZ plane whereas base signal unit 14B scans in the YZ plane. This embodiment is useful for determining the angular position of remote signal unit 18 in the XZ plane (by base unit 14A) and the YZ plane (by base unit 14B).

Figure 5:
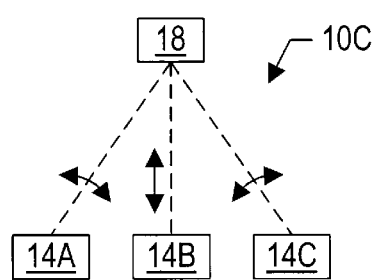
FIG. 5 is a block diagram of another embodiment of a scanning absolute position tracker according to the present invention which uses three base units and a single remote unit.

FIG. 5 is a block diagram of a position tracking system 10C according to the present invention, useful for determining the absolute X, Y and Z positions of remote signal unit 18 in the coordinate system. This embodiment employs three base signal units designated 14A, 14B and 14C. Base signal units 14A and 14C scan in the XZ plane, whereas base signal unit 14B scans in the YZ plane. In this embodiment, the angular position of remote signal unit 18 relative to base signal units 14A and 14C in the XZ plane may be calculated, together with the angular position of remote signal unit 18 relative to base signal unit 14B in the YZ plane. Base signal units 14A and 14C may be used to calculate the X and Z positions of remote signal unit 18 as in the embodiment shown in FIG. 3. The position of remote signal unit 18 in the XZ plane may be used together with the angular position in the YZ plane to determine the absolute Y position.

Figure 6:
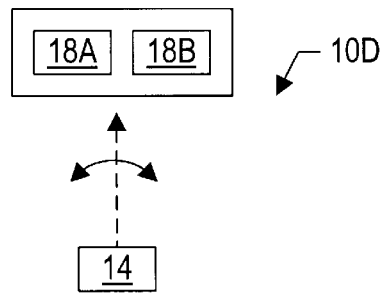
FIG. 6 is a block diagram of another embodiment of a scanning absolute position tracker according to the present invention which uses a single base unit and two remote units.

FIG. 6 is a block diagram of a position tracking system 10D according to the present invention. In this embodiment, a single base signal unit 14 and two remote signal units 18A and 18B are employed. Base signal unit 14 includes signal identifying means (not shown) to associate the remote signal units with their response signals. Alternatively, separate signal sources and/or sensors may be employed. In this embodiment, the angular position of each detector 18A and 18B relative to base signal unit 14 may be calculated.

FIG. 7 is a block diagram of a position tracker 10E according to the present invention. This embodiment employs two base signal units 14A and 14B as in FIG. 3 and two remote signal units 18A and 18B. This configuration allows the absolute X and Z positions of each remote signal unit to be determined. From this information, the angular position of an axis 80 passing through the remote signal units in the XZ plane may be determined.

FIG. 8 is a block diagram of a position tracking system 10F according to the present invention. In this embodiment, three base signal units 14A, 14B, and 14C as in FIG. 5 and two detector units 18A and 18B are employed. In this embodiment, the X, Y and Z positions of each remote signal unit may be determined. This information may be used to determine the orientation of the axis 80 in the XZ and XY planes (yaw and pitch). Note, however, that this system cannot detect the roll orientation of the remote detectors (i.e., the rotational position of the detectors about axis 80).

FIG. 9 is a block diagram of a position tracker 10G according to the present invention. This embodiment employs one base signal unit 14 and three remote signal units 18A, 18B and 18C. This system detects the angular position of each remote signal unit 18A, 18B and 18C relative to base signal unit 14.

FIG. 10 is a block diagram of a position tracker 10H according to the present invention. This embodiment employs two base units 14A and 14B as in FIG. 7 and three remote units 18A, 18B and 18C. This embodiment provides the absolute X and Z positions of each remote signal unit plus the orientation of axis 80 in the XZ plane.

FIG. 11 is a block diagram of a position tracker 10J according to the present invention. This embodiment employs three base signal units 14A, 14B and 14C as in FIG. 8, and three remote signal units 18A, 18B and 18C. This embodiment provides the absolute X, Y and Z position of each remote signal unit, together with the orientation of axis 80 in the XY and XZ planes. Furthermore, this embodiment calculates the orientation of an axis 84 in the YZ plane.

Thus, not only do you know the absolute X, Y, and Z position of the remote signal unit assembly, but also its roll, pitch and yaw orientation.

Figure 12:
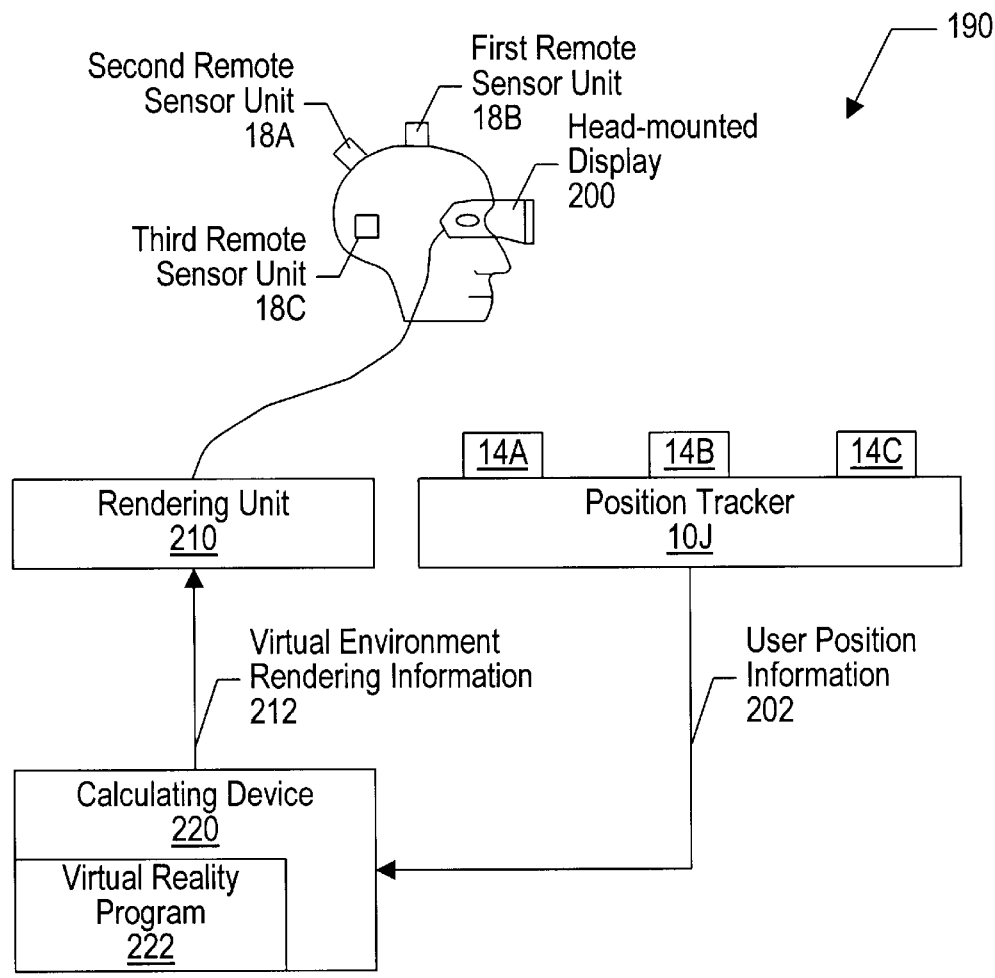
FIG. 12 shows the use of the position tracker in a virtual reality system.

FIG. 12 depicts a virtual reality system 190 which includes a user wearing a head-mounted display 200. Display 200 includes three remote sensor units 18A–C as described above in relation to FIG. 11. System 190 further includes the above-described position tracker 10J coupled to sense the orientation/position of the user. Position tracker 10J includes base units 14A–C configured to receive signals from remote units 18 described above. Position tracker 10J is configured to compute a position and orientation of the user and convey this information to a calculating device 220 as user position information 202. Calculating device 220 is running a virtual reality program 222 which is executable to present a virtual environment to the user via head-mounted display 200. Virtual reality program 222 utilizes user position information 202 to create a virtual representation of the user as well as objects within the virtual environment. This allows the user to interact with objects in the virtual environment as shown below with reference to FIG. 13. Program 222 generates graphical rendering information 212 which is conveyed to rendering unit 210. Unit 210 uses information to generate a graphical representation of the environment modeled by program 222. This graphical representation is conveyed to head-mounted display 200 via an attached video cable. The resultant graphical image effectively immerses the viewer in the virtual environment.

Figure 13:
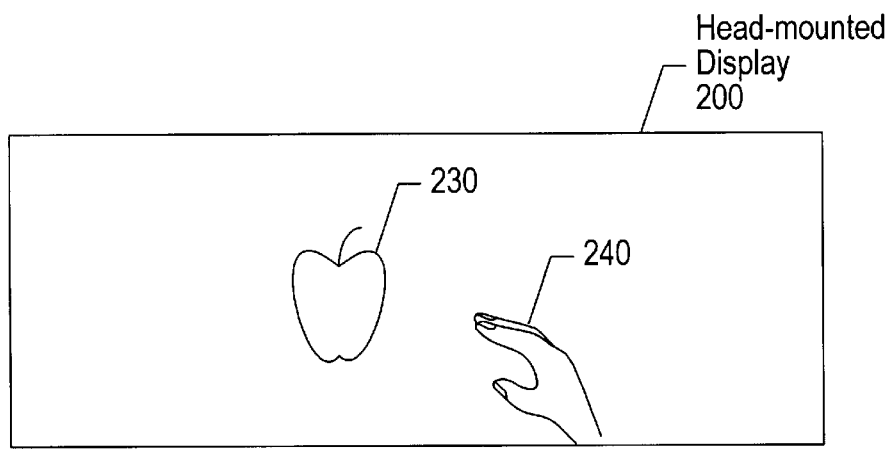
FIG. 13 shows a virtual scene rendered on the display.

FIG. 13 depicts a virtual scene rendered on display 200. Display 200 shows a virtual object (an apple, in one embodiment) 230. Display 200 further depicts a virtual representation 240 of the hand of the user. (This further assumes that system 190 further includes a glove mechanism, such as that disclosed in U.S. Pat. No. 4,988,981 incorporated by reference below. The position tracker for the glove is not shown in FIG. 12 for simplicity and clarity). By rendering virtual objects as well as a virtual representation of body portions of the user, system 190 allows the user to interact with objects in the virtual world.

While the above is a complete description of a preferred embodiment of the present invention, various modifications may be employed. The position tracker according to the present invention may be used in a number of applications. For example, virtual reality systems such as those disclosed in U.S. patent application Ser. No. 317,107, filed Feb. 28, 1989, entitled "Computer Data Entry and Manipulation Apparatus and Method", now U.S. Pat. No. 4,988,981 and U.S. Pat. No. 5,588,139, previously U.S. patent application Ser. No. 08/133,802, which is a continuation of U.S. patent application Ser. No. 5.35,253 filed Jun. 7, 1990, entitled "Virtual Reality Network," both incorporated herein by reference, may use the position tracker according to the present invention to determine the spatial position and/or orientation of a head, a hand, or some other body part or real object. More than three base or remote units may be used to improve the range of the system (e.g., add two 90° scanning base units to obtain an overall range of 180°) or the accuracy of the system (e.g., by using the weighted average of multiple units). Multiple base/remote units need not be orthogonal to each other. They may be placed at the corners of any triangle or polygon, they may be collinear, or any other desired formation for the application. Consequently, the scope of the invention should not be limited except as described in the claims.

What is claimed is:

1. A system for a user to interact with a virtual object, comprising:

a head-mounted display for immersing the user in a virtual scene which includes the virtual object;

a graphics processing unit coupled to the display, wherein the graphics processing unit is configured to render the virtual scene on the head-mounted display;

a calculating device configured to execute a virtual reality program, wherein said virtual reality program-utilizes a position of the user and a position of the virtual object in order to generate graphical information representative of the virtual scene, and wherein said calculating device is configured to convey said graphical information to said graphics processing unit for rendering; and a position tracker, connected to the calculation device, which informs the calculating device of the position of the user, comprising;

a first base light signal unit comprising:
  a first base line signal sensor;
  a first base light signal source for emitting a first base light signal which scans a first path in a first plane;

a second base light signal unit comprising:
  a second base light signal sensor;
  a second base light signal source for emitting a second base light signal which scans the first path;

a third base light signal unit comprising:
  a third base light signal sensor;
  a third base light signal source for emitting a third base light signal which scans a second path in a second plane, the second plane being generally perpendicular to the first plane;

to a first remote light signal unit comprising:

first remote light signal sensing means for sensing the first, second and third base light signal units;

first light signal identifying means, coupled to the first remote light signal sensing means, for identifying the sensed first, second and third base light signals;

first response means, coupled to the light signal identifying means, for emitting a first response light signal toward the first base light signal unit in response to the first base light signals, for emitting a second response light signal toward the second base light signal unit in response to the second base light signals, and for emitting a third response light signal toward the third base light signal unit in response to the third base light signals;

a second remote light signal unit comprising:

second remote light signal sensing means for sensing the first, second and third base light signals emitted by the first, second and third base light signal units;

second light signal identifying means, coupled to the second remote light signal sensing means, for identifying the sensed first, second and third base light signals;

second response means, coupled to the second light signal identifying means, for emitting a fourth response light signal toward the first base light signal unit in response to the first base light signals, for emitting a fifth response light signal toward the second base light signal unit in response to the second base light signals and for emitting a sixth response light signal toward the third base light signals;

a third remote light signal unit comprising:

third remote light signal sensing means for sensing the first, second and third base light signals emitted by the first, second and third base light signal units;

third light signal identifying means, coupled to the third remote light signal sensing means, for identifying the sensed first, second and third base light signals;

third response means, coupled to the third light signal identifying means, for emitting a seventh response light signal toward the first base light signal unit in response to the first base light signals, for emitting an eighth response light signal toward the second base light signal unit in response to the second base light signals, and for emitting a ninth response light signal toward the third base light signal unit in response to the third base light signals;

first base angle calculating means, coupled to the first base light signal unit, for calculating the angle of the first remote light signal unit along the first plane in response to the first response light signals, for calculating the angle of the second remote light signal unit along the first plane in response to the fourth response light signals, and for calculating the angle of the third remote light signal unit along the first plane in response to the seventh response light signals;

second base angle calculating means, coupled to the second base light signal unit, for calculating the angle of the first remote light signal unit along the first plane in response to the second response light signals, for calculating the angle of the second remote light signal unit along the first plane in response to the fifth response light signals, and for the calculating the angle of the third remote light signal unit along the first plane in response to the eighth response light signals;

third base angle calculating means, coupled to the third base light signal unit, for calculating the angle of the first remote light signal unit along the second plane in response to the third response light signals, for calculating the angle of the second remote light signal unit along the second plane in response to the sixth response light signals, and for calculating the angle of the third remote light signal unit along the second plane in response to the ninth response light signals;

first remote position calculating means, coupled to the first and second base angle calculating means, for calculating the position of the first, second and third remote light signal units along a first base axis in the first plane;

second remote position calculating means, coupled to the first and second base angle calculating means, for calculating the positions of the first, second and third remote light signal units along a second base axis in the first plane, the second base axis being generally perpendicular to the first base axis;

third remote position calculating means, coupled to the third base angle calculating means, for calculating the positions of the first, second and third remote light signal units along a third base axis in the second plane, the third base axis being generally perpendicular to the first and second base axes.

2. The system according to claim 1, wherein the first and second remote signal units are disposed on a remote axis, the position tracker further comprising:

yaw orientation calculating means, coupled to the first and second remote position calculating means, for calculating the yaw orientation of the remote axis.

3. The system according to claim 2, wherein the position tracker further comprises:

pitch orientation calculating means, coupled to the first, second and third remote position calculating means, for calculating the pitch orientation of the remote axis.

4. The system according to claim 3, wherein the third remote signal unit is disposed off the remote axis, the position tracker further comprising:

roll orientation calculating means, coupled to the first, second and third remote position calculating means, for calculating the roll orientation of the remote axis.

* * * * *

UNITED STATES PATENT AND TRADEMARK OFFICE

CERTIFICATE OF CORRECTION

PATENT NO. : 5,812,257

DATED : September 22, 1998

INVENTOR(S) : Michael A. Teitel and Jean-Jacques G. Grimaud

It is certified that error appears in the above-identified patent and that said Letters Patent is hereby corrected as shown below:

Claim 1, col. 5, line 59, please delete the hyphen between "program" and "utilizes".

Claim 1, col. 6, line 2, please change "line" to "light".

Claim 1, col. 6, line 15, please delete "to".

Signed and Sealed this

Ninth Day of February, 1999

Attest:

Attesting Officer

*Acting Commissioner of Patents and Trademarks*